United States Patent
Schlecht et al.

(10) Patent No.: US 7,258,605 B2
(45) Date of Patent: Aug. 21, 2007

(54) HEATING SYSTEM FOR A VEHICLE

(75) Inventors: Patric Schlecht, Ostfildern (DE); Uwe Kohle, Deizisau (DE); Oliver Sauter, Denkendorf (DE)

(73) Assignee: J. Eberspächer GmbH & Co.KG (DE)

( * ) Notice: Subject to any disclaimer, the term of this patent is extended or adjusted under 35 U.S.C. 154(b) by 13 days.

(21) Appl. No.: 10/840,213

(22) Filed: May 5, 2004

(65) Prior Publication Data

US 2004/0231832 A1 Nov. 25, 2004
US 2005/0109498 A9 May 26, 2005

(30) Foreign Application Priority Data

May 7, 2003 (DE) ................. 103 20 340

(51) Int. Cl.
    *B60S 1/54* (2006.01)
(52) U.S. Cl. ...................... 454/121; 454/143
(58) Field of Classification Search ............... 454/121, 454/126, 143; 165/41, 42
    See application file for complete search history.

(56) References Cited

U.S. PATENT DOCUMENTS

| 3,521,653 | A | * | 7/1970 | Walter et al. | ............... 137/831 |
| 4,531,671 | A | * | 7/1985 | Schwenk | ............... 237/12.3 B |
| 4,773,310 | A | * | 9/1988 | Corwin | ............... 454/244 |
| 4,829,884 | A | * | 5/1989 | Kagohata | ............... 454/75 |
| 5,885,152 | A | * | 3/1999 | Wardlaw | ............... 454/121 |
| 5,901,943 | A | * | 5/1999 | Tsunoda | ............... 251/294 |
| 5,964,658 | A | * | 10/1999 | Aizawa | ............... 454/156 |
| 5,983,649 | A | * | 11/1999 | Aislabie et al. | ............... 62/133 |
| 6,045,444 | A | * | 4/2000 | Zima et al. | ............... 454/121 |
| 6,293,339 | B1 | * | 9/2001 | Uemura et al. | ............... 165/203 |
| 6,296,562 | B1 | * | 10/2001 | Uemura et al. | ............... 454/121 |
| 6,308,770 | B1 | * | 10/2001 | Shikata et al. | ............... 165/42 |
| 2002/0197949 | A1 | | 12/2002 | Kampf et al. | |

FOREIGN PATENT DOCUMENTS

| DE | 41 15 141 A1 | 3/1993 |
| DE | 100 25 713 | 12/2001 |
| DE | 101 10 558 | 9/2002 |
| DE | 101 28 166 | 12/2002 |
| EP | 0 023 052 A1 | 1/1981 |
| JP | 61050822 | 3/1986 |

* cited by examiner

*Primary Examiner*—Derek S. Boles
(74) *Attorney, Agent, or Firm*—McGlew and Tuttle P.C.

(57) ABSTRACT

A heating system for a vehicle has a heating air blower (24) for generating a heating air stream to be introduced into the interior space of a vehicle, a heater (22) with a heat exchanger arrangement (26) for heating the heating air stream being delivered by the heating air blower (24), a mixing arrangement (20) for setting an outside air/ambient air ratio of the air to be fed to the heat exchanger arrangement (26), an outside temperature sensor arrangement (60) for generating an output linked with an outside temperature, and an actuating device (42, 46). The actuating device (42, 46) actuates the mixing arrangement (20) for setting the outside air/ambient air ratio on the basis of an output of the outside temperature sensor arrangement (60).

22 Claims, 1 Drawing Sheet

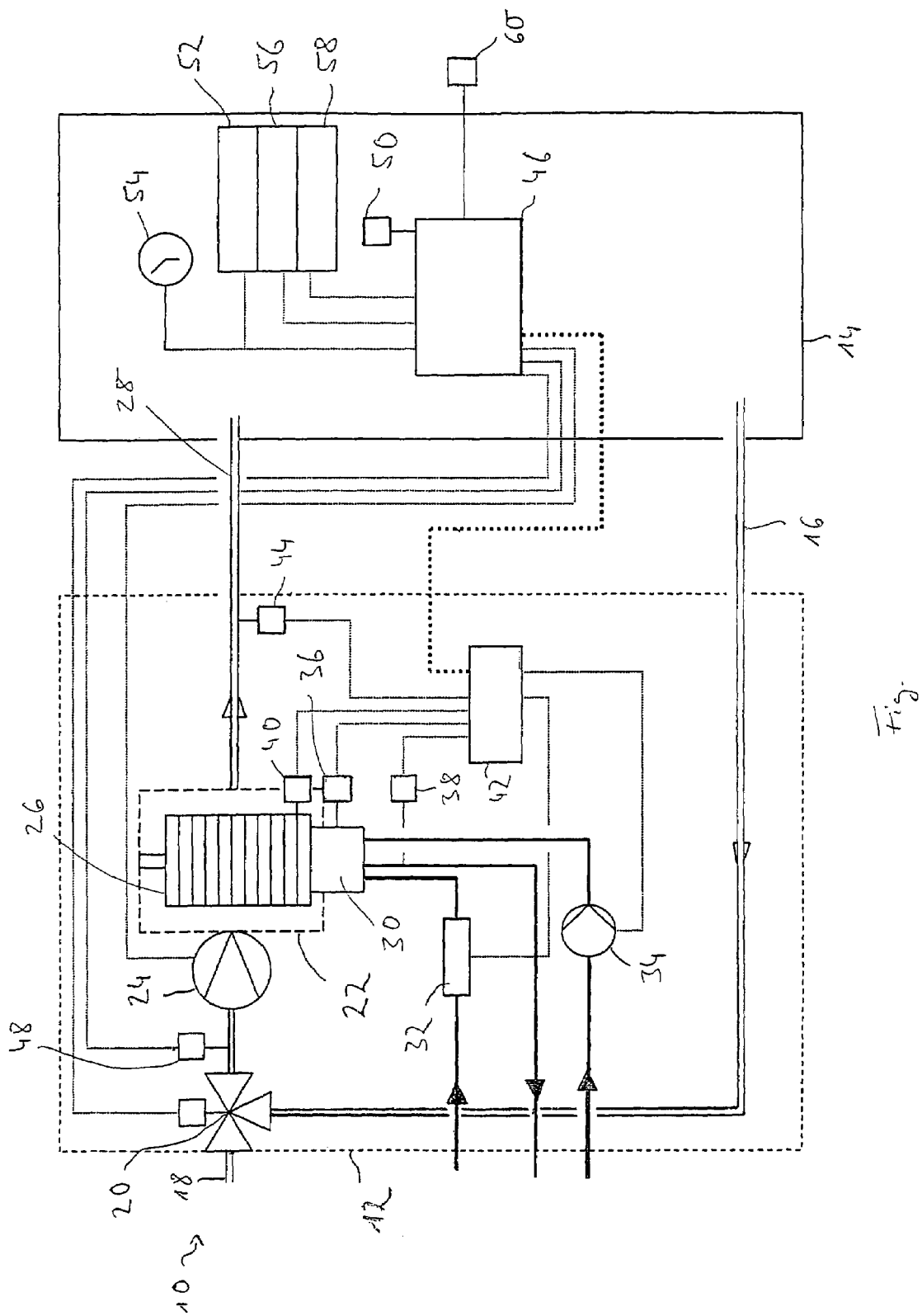

HEATING SYSTEM FOR A VEHICLE

CROSS REFERENCE TO RELATED APPLICATIONS

This application claims the benefit of priority under 35 U.S.C. § 119 of German patent application DE 103 20 340.0 filed May 7, 2003 the entire contents of which are incorporated herein by reference.

FIELD OF THE INVENTION

The present invention pertains to a heating system for a vehicle, comprising a heating air blower for generating a heating air stream to be introduced into the interior space of a vehicle, a heater with a heat exchanger arrangement for heating the heating air stream being delivered by the heating air blower, and a mixing arrangement for setting an outside air/ambient air ratio of the air to be fed into the heat exchanger arrangement.

BACKGROUND OF THE INVENTION

Such heating systems are used in vehicles in order to bring the interior space of a vehicle to desired temperatures in a parking heating mode or also in an auxiliary heating mode. The temperature to which the interior space of the vehicle is to be preheated may be preset, for example, by a user of the vehicle, so that, on the one hand, comfortable temperatures will prevail in the interior space of the vehicle at the beginning of the travel, e.g., in the winter, and, on the other hand, the windshields are already defogged and the greatest possible safety is offered.

SUMMARY OF THE INVENTION

The object of the present invention is to provide a heating system for a vehicle that can further improve the comfort that can be attained for the user of the vehicle.

According to a first aspect of the present invention, this object is accomplished by a heating system for a vehicle, comprising a heating air blower for generating a heating air stream to be introduced into the interior space of the vehicle, a heater with a heat exchanger arrangement for heating the heating air stream being delivered by the heating air blower, a mixing arrangement for setting an outside air/ambient air ratio of the air to be fed to the heat exchanger arrangement, an outside temperature sensor arrangement for generating an output that is linked with the outside temperature, an actuating arrangement for actuating the mixing arrangement for setting the outside air/ambient air ratio on the basis of an output of the outside temperature sensor arrangement.

By taking into account the outside temperature, i.e., the temperature prevailing in the area of the environment of the vehicle, during the setting of the outside air/ambient air ratio, it can be ensured that by admixing a sufficient amount of outside air, i.e., fresh air, with the air that was drawn off from the interior space of the vehicle is to be reheated, the highest possible percentage of fresh air will ensure a high oxygen content in the interior space of the vehicle, and that the risk for fogging of the windshields with moisture is diminished.

It is especially advantageous in this connection if the actuating device actuates the mixing arrangement such that the outside air/ambient air ratio is lower at a low outside temperature.

According to another aspect of the present invention, the object mentioned in the introduction is accomplished by a heating system for a vehicle, comprising a heating air blower for generating a heating air stream to be introduced into the interior space of the vehicle, a heater with a heat exchanger arrangement for heating the heating air stream being delivered by the heating air blower, a mixing arrangement for setting an outside air/ambient air ratio of the air to be fed into the heat exchanger arrangement, a vehicle interior space temperature sensor arrangement for generating an output that is linked with the temperature of the interior space of the vehicle, and an actuating device for actuating the mixing arrangement for setting the outside air/ambient air ratio on the basis of the output of the vehicle interior space temperature sensor arrangement.

Even if the temperature of the interior space of the vehicle is used as the basis for the actuation, it is possible to ensure that the percentage of outside air or fresh air can be maintained at the highest possible level, taking into account the circumstance that the desired temperature should be reached or that it should be reached as quickly as possible.

It is, furthermore, advantageous in this case as well if the actuating arrangement actuates the mixing arrangement such that the outside air/ambient air ratio is lower at a lower temperature of the interior space.

According to another aspect of the present invention, the object mentioned in the introduction is accomplished by means of a heating system comprising a heating air blower for generating a heating air stream to be introduced into the interior space of the vehicle, a heater with a heat exchanger arrangement for heating the heating air stream being delivered by the heating air blower, a mixing arrangement for setting an outside air/ambient air ratio of the air to be fed into the heat exchanger arrangement, a vehicle interior space temperature sensor arrangement for generating an output that is linked with the temperature of the interior space of the vehicle, a vehicle interior space temperature presetting arrangement, an actuating arrangement for actuating the mixing arrangement for setting the outside air/ambient air ratio on the basis of a deviation of the temperature of the interior space from the desired temperature of the interior space.

The difference between the interior space desired temperature and the interior space temperature for presetting the percentage of outside air to be added also makes it possible to increase the percentage of outside air or fresh air in case of a suitable heating characteristic).

Furthermore, the system according to the present invention may be designed such that a heating air stream temperature sensor arrangement is provided for generating an output that is linked with the temperature at which the heating air stream heated by the heater is discharged, the actuating arrangement being designed to set the delivery capacity of the heating air blower on the basis of an output of a vehicle interior space temperature sensor arrangement and the interior space desired temperature preset by the vehicle interior space temperature presetting arrangement and to set the heat output of the heater on the basis of the output of the heating air stream temperature sensor arrangement.

Furthermore, it is possible for the actuating arrangement to comprise a first actuating device for actuating the heating air blower and the mixing arrangement as well as a second actuating device for actuating the heater, wherein the first actuating device has the output of an outside temperature sensor arrangement or/and of a vehicle interior space temperature sensor arrangement or/and of a vehicle interior space desired temperature presetting arrangement as the input variables.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

The only FIGURE is a schematic view of a heating system according to the present invention.

DESCRIPTION OF THE PREFERRED EMBODIMENT

The heating system 10 shown in the FIGURE comprises as its essential component a temperature control module 12 circled by broken line. This temperature control module 12 takes in air, whose temperature is to be controlled, from a vehicle interior space 14 indicated schematically through a line 16, on the one hand, and from the outside through a line 18, on the other hand. These two air streams are mixed in a mixer 20 and sent to a heater 22. This takes place under the delivery action of a blower 24 arranged upstream of the heater. An air stream, which flows through a heat exchanger arrangement 26 of the heater 22 and, indicated by a line 28, enters the vehicle interior space 14, is thus generated.

It shall be stated concerning the design of the heater 22 per se that it may be of the conventional design and have a heating burner 30, which is indicated only schematically and to which fuel to be burned is fed via a metering pump 32 and to which the combustion air necessary for burning together with the fuel is fed via a combustion air blower 34. The heating burner 30 may be an atomization burner or a vaporizing burner, and an igniting member 36, for example, a glow type ignition pin, is associated with the heating burner 30 for igniting same. Furthermore, a flame sensor 38 may be associated with this burner, while an overheating sensor 40 may be associated with the heat exchanger arrangement 26. Together with the metering pump 32 and the combustion air blower 34, the heater 22 per se is actuated by an actuating device generally designated by 42. The glow type ignition pin 36, which is to be activated during the start phase of the heater 22, is also actuated by the actuating device 42. The actuating device 42 receives, furthermore, an output of a discharge temperature sensor 44, which detects the temperature of the air stream after this had flown through the heat exchanger arrangement 26, besides the outputs of the sensors 38, 40 already mentioned. It is obvious that the discharge temperature sensor 44 may also be arranged upstream of the blower 24 and can detect the temperature of the air stream upstream of this blower 24.

Another actuating device or control device 46 is associated with the blower 24, which means that the blower 24 is operated by generating corresponding actuating commands according to the preset values of the control device 46. The control device 46, which can, furthermore, also actuate the mixer 20 for setting the ambient air/fresh air ratio, receives different input variables. These are, on the one hand, the output of a temperature sensor 48, which detects the temperature of the air stream entering the heat exchanger arrangement 26. Furthermore, the interior air temperature sensor 50 sends its output into the control device 46. A start presetting arrangement 52, for example, an operating switch, may generate a signal, which indicates for the control device 46 that the heating system 10 is to be operated, for example, in a parking heating mode or in an auxiliary heating mode. Corresponding information may also be generated by a programmable timer 54. This information, which represents the start phase of the heating operation, may also be sent to the actuating device 42, either directly from the areas (presetting arrangement, programmable timer) 52, 54, or mediated by the control device 46. Furthermore, the control device 46 receives information on the temperature to which the interior space of the vehicle shall be heated or on the temperature at which it shall be maintained from a vehicle interior space desired temperature presetting arrangement 56, for example, a temperature selector. A fresh air/ambient air ratio selection arrangement 58 makes it possible to preset a certain ratio of fresh air to ambient air or to operate, for example, in the fresh air mode or in the ambient air mode. The arrangements (presetting arrangement, temperature presetting arrangement, fresh air/ambient air ratio selection arrangement ) 52, 56, 58 may be, e.g., arrangements that can be actuated manually, but they may also be implemented in the form of an actuating system area, which generates corresponding preset values and provides these as information to be processed for the control device 46, so that these arrangements may, for example, also be part of the control device 46 itself Furthermore, an outside temperature sensor 60 is provided, which detects the temperature of the outside environment of a vehicle and sends its output signal to the control device 46.

The operation of the heating system 10 according to the present invention, which is shown in the FIGURE, will be explained in greater detail below on the basis of the parking heating operation. It shall be assumed for this, for example, that a command for switching on, i.e., a command that signals that the heating operation shall be started, is generated either by the timer 54 or the arrangement 52. Since it can be assumed that the parking heating mode is used at a comparatively low outside temperature only and that the interior space of the vehicle is already preheated by sunlight to a certain extent and the air contained therein therefore already has a higher temperature than the outside air, it is possible to preset the circulating mode by means of the arrangement 58, which can be implemented in such a way that only the ambient air drawn off from the interior space 14 of the vehicle is introduced by the mixer 20, or this ambient air is used with the addition of a small percentage of fresh air, e.g., 15%, and is sent to the heat exchanger arrangement 26. Furthermore, the arrangement 56 generates a vehicle interior space desired temperature, which may be, e.g., +20° C.

The information that the parking heating operation is to be started is also sent, as was described above, to the actuator or actuating device 42, so that the actuating device 42 now puts the heater 22 into operation by exciting the metering pump 32, the combustion air blower 34 and the glow type ignition pin 36. When the heater 22 has been put into operation or, e.g., when the flame sensor 38 recognizes that the heating burner 30 has been ignited and the heater 22 is thus in a state in which combustion heat can be transferred in the heat exchanger arrangement 26 to the air stream flowing through the heater, the control device 46 activates the blower 24 in order to generate an air circulation or air flow. The delivery capacity of the blower. 24 is now determined by the difference between the desired temperature in the interior space of the vehicle, preset by the arrangement 56, and the temperature of the interior space of the vehicle, detected by the sensor arrangement 50. The greater this temperature difference, the higher is the delivery capacity of the blower 24 set in order to ensure that a relatively large amount of heated air introduced into the interior space 14 of the vehicle can bring about the most rapid heating possible of the interior space 14 of the vehicle, i.e., that the actual temperature detected by the sensor arrangement 50 is brought to the desired temperature of the interior space of the vehicle as quickly as possible.

A value is preset in the actuating device 42 for the desired temperature of the air stream leaving the heat exchanger arrangement 26. This value, which is set, e.g., as a fixed and unchangeable value, is selected to be such that the air leaving the heat exchanger arrangement 26 and flows into the pipe system made, in general, of a plastic material, cannot cause thermal deformations of the various plastic components. It shall be assumed, for example, that this desired temperature is 65° C. However, a temperature in the range of up to 80° C. is desirable here. The heater 22 compares this desired temperature with the actual temperature of the air stream, which is detected by means of the sensor arrangement 44, and changes the amount of thermal energy released by the combustion in the heating burner 30 and, as a consequence of this, the heat output of the heater 22 depending on the result of the comparison. The heat output needed to reach this desired temperature, which is preset as a fixed value, will depend essentially on the temperature at which the air enters the heat exchanger arrangement 26, and the air mass flow that passes through the heat exchanger arrangement 26. The larger the amount of air passing through this heat exchanger arrangement 26, the larger the amount of thermal energy that must be provided by means of the heating burner 30 in order to reach the desired temperature in the range of, e.g., 65° C. at the discharge area or for introduction into the interior space 14 of the vehicle. However, it follows from this that even though the control device 46 actuating the blower 24 does not have a direct effect on the operation of the heater 22, because there is no corresponding actuating connection, the delivery capacity preset for the blower 24 by the actuating device 46 will have an effect on the temperature of the air leaving the heat exchanger arrangement 26, and the actuating device 42 will in this respect adjust the heat output of the heater 22 or of the burner 30 of the said heater 22 correspondingly according to the detection of this temperature when, for example, the delivery capacity of the blower 24 increases. There is a close relationship in this respect between the actuation characteristic of the control device 46 and the actuation characteristic of the actuating device 42 for the two system areas being operated by these control devices, even though neither of these control devices does perform actuation in the other system area by correspondingly presetting actuating variables. This makes it possible to integrate the heater 22 with the actuating device 42 associated with it and, of course, also the metering pump 32 and the combustion air blower 34 in an overall system as a system area which has an essentially independent design and also operates autarchically. As a result, changes in terms of the actuation technique are not necessary for the blower 24 in the area of the control device 46.

It shall be pointed out that additional information, e.g., the temperature of the air entering the heat exchanger arrangement 26, detected by the sensor arrangement 48, as well as other external parameters, such as the outside air temperature, outside air pressure and the like, may, of course, also be used in the various control devices 42 and 46, in addition to the aforementioned input variables, on which the actuation of the different system areas is based, which comprise measured variables, on the one hand, and, on the other hand, set points that are preset either as fixed values or can be preset as variable values. It is obvious that the system shown in the FIGURE may also comprise additional areas, for example, an air conditioning unit, associated with the blower 24, which may thus also be actuated by the control device 46. It is, of course, also possible, e.g., to arrange the blower 24 upstream of the heat exchanger arrangement 26.

In order to increase the comfort for the persons who will then use the vehicle with the above-described system, e.g., in the parking heating mode, the objective is to enrich the air to be introduced into the interior space 14 of the vehicle with the largest possible percentage of fresh air, but to also be able to provide the desired temperatures in a short time. According to one aspect of the present invention, provisions may be made for this for the control device 46 to actuate the mixer 20 in such a way that the output signal of the outside temperature sensor 60 is taken into account in order to set the outside air/ambient air ratio such that the desired temperatures can be reached in the interior space of the vehicle by the subsequent heating of the mixture, on the one hand, but, on the other hand, the percentage of ambient air and consequently of the fresh air is as high as possible. The connection may be such in this case that the control device 46 actuates the mixer 20 to increase the percentage of outside air, i.e., to increase the outside air/ambient air ratio when the outside temperature rises, which becomes recognizable from a corresponding change in the output signal of the temperature sensor 60. In other words, the percentage of outside air added additionally will be lower at lower outside temperatures than is the case at higher outside temperatures. It is possible as a result not only to reach the highest possible percentage of outside air and consequently the highest possible oxygen content in the air to be fed into the interior space 14 of the vehicle, but also to ensure that the risk for fogging of the windows with moisture during the phase of rest during the night will be reduced.

The mixer 20 can be actuated to set a defined ratio such that air streams can be fed in simultaneously at the desired mixing ratio via the lines 16 and 18 and sent to the heat exchanger arrangement 26 via the blower 24. However, it is also possible to operate cyclically, i.e., to feed in air from the line 16 to the heat exchanger arrangement 26 during one phase and air from the line 18 to the heating system arrangement during another phase following that phase, so that a corresponding mixing ratio will be averaged over time.

In another possibility of increasing comfort, the mixer 20 can be actuated by means of the control device 46 such that the output of the interior space temperature sensor 50 is taken into account. If the temperature of the interior space is comparatively high, the percentage of outside air or fresh air to be added can be increased, because the risk that the desired temperatures in the interior space cannot be reached or cannot be reached in the desired time even at comparatively low outside temperatures is practically absent in this case. It is also possible in this case to provide for the continuous mixing of the two air streams of the lines 16 and 18 or for the cyclic or intermittent introduction of ambient air and outside air.

Another possibility of making the percentage of the outside air to be added as high as possible is to base the actuation of the mixer 20 on the deviation of the temperature of the interior space from the interior space desired temperature. If this deviation is relatively small, i.e., the temperature of the interior space is close to the desired temperature, the percentage of fresh air to be added or fed in can be increased, whereas the percentage of fresh air to be added is reduced in case of a comparatively great deviation of the temperature of the interior space from the desired temperature of the interior space, especially if the temperature of the interior space is still below the desired temperature of the interior space, in order to reach the desired temperature in the interior space 14 of the vehicle as quickly as possible.

The above-mentioned cyclic operation is, of course, possible in this case as well.

The above-described procedures of actuating the mixer 20 for setting the ratio of the amount of outside air to the amount of ambient air make it possible to vary this ratio in a broad range, for example, from a value of 0, i.e., operation with ambient air only, to a state in which practically only outside air or ambient air is fed in, at least during shorter phases, when the temperature in the interior space 14 of the vehicle is within the desired range. The above-described procedures are especially advantageous at the beginning of the phase of heating, but they may also be activated or continue to be activated during the longer-lasting operation. Furthermore, it is, of course, possible to force a change in this ratio, which is preset per se by the control device 46, by presetting by the driver using the fresh air/ambient air ratio selection arrangement 58.

While a specific embodiment of the invention has been shown and described in detail to illustrate the application of the principles of the invention, it will be understood that the invention may be embodied otherwise without departing from such principles.

What is claimed is:

1. A heating system for a vehicle, the heating system comprising:
   a heating air blower for generating a heating air stream to be introduced into the interior space of the vehicle;
   a heater comprising a heating burner supplied with fuel and combustion air for burning a fuel/air-mixture and generating heat;
   a heat exchanger arrangement for transferring said heat to the heating air stream being delivered by said heating air blower;
   a heating air stream temperature sensor arrangement for generating an output linked with the temperature at which the heating air stream heated by said heater is discharged;
   a mixing arrangement for setting an outside air/ambient air ratio of the air to be fed to said heat exchanger arrangement;
   an outside temperature sensor arrangement for generating an output linked with an outside temperature; and
   a control arrangement for controlling said mixing arrangement to set an outside air/ambient air ratio on the basis of an output of said outside temperature sensor arrangement and to set the heat output of said heater on the basis of the output of said heating air stream temperature sensor arrangement.

2. A heating system in accordance with claim 1, wherein said control device controls said mixing arrangement such that the outside air/ambient air ratio is lower in case of a lower outside temperature.

3. A heating system for a vehicle, the heating system comprising:
   a heating air blower for generating a heating air stream to be introduced into the interior space of a vehicle;
   a heating air stream temperature sensor arrangement for generating an output linked with the temperature at which the heating air stream heated by said heater is discharged;
   a heater comprising a heating burner supplied with fuel and combustion air for burning a fuel/air-mixture and generating heat;
   a heat exchanger arrangement for transferring said heat to the heating air stream being delivered by said heating air blower;
   a mixing arrangement for setting an outside air/ambient air ratio of the air to be fed into said heat exchanger arrangement;
   a vehicle interior space temperature sensor arrangement for generating an output linked with the temperature of the interior space of the vehicle; and
   a control arrangement for controlling said mixing arrangement for setting the outside air/ambient air ratio on the basis of the output of said vehicle interior space temperature sensor arrangement and to set the heat output of said heater on the basis of the output of said heating air stream temperature sensor arrangement.

4. A heating system in accordance with claim 3, wherein said controlling arrangement controls said mixing arrangement such that the outside air/ambient air ratio is lower in case of a lower temperature of the interior space of the vehicle.

5. A heating system for a vehicle, the heating system comprising:
   a heating air blower for generating a heating air stream to be introduced into the interior space of a vehicle;
   a heater comprising a heating burner supplied with fuel and combustion air for burning a fuel/air-mixture and generating heat;
   a heat exchanger arrangement for transferring said heat to the heating air stream being delivered by said heating air blower;
   a heating air stream temperature sensor arrangement for generating an output linked with the temperature at which the heating air stream heated by said heater is discharged;
   a mixing arrangement for setting an outside air/ambient air ratio of the air to be fed into said heat exchanger arrangement;
   a vehicle interior space temperature sensor arrangement for generating an output linked with the temperature of the interior space of the vehicle;
   a vehicle interior space desired temperature presetting arrangement; and
   a control device for controlling said mixing arrangement for setting the outside air/ambient air ratio on the basis of a deviation of the temperature of the interior space of the vehicle from the interior space desired temperature and to set the heat output of said heater on the basis of the output of said heating air stream temperature sensor arrangement.

6. A heating system in accordance with claim 1, further comprising:
   a vehicle interior space desired temperature presetting arrangement; and
   a vehicle interior space temperature sensor arrangement, wherein said controlling arrangement is designed to set the delivery capacity of said heating air blower on the basis of an output of said vehicle interior space temperature sensor arrangement and the interior space desired temperature preset by said vehicle interior space desired temperature presetting arrangement.

7. A heating system in accordance with claim 1, wherein said controlling arrangement comprises a first control device for controlling said heating air blower and said mixing arrangement as well as a second control device for controlling said heater, wherein said first control device has the output of said outside temperature sensor arrangement and/or of a vehicle interior space temperature sensor arrangement and/or of a vehicle interior space desired temperature presetting arrangement as the input variables.

8. A heating system in accordance with claim 3, further comprising:
a vehicle interior space desired temperature presetting arrangement, wherein said controlling arrangement is designed to set the delivery capacity of said heating air blower on the basis of an output of said vehicle interior space temperature sensor arrangement and the interior space desired temperature preset by said vehicle interior space desired temperature presetting arrangement.

9. A heating system in accordance with claim 3, wherein said controlling arrangement comprises a first control device for controlling said heating air blower and said mixing arrangement as well as a second control device for controlling said heater, wherein said first control device has the output of said outside temperature sensor arrangement and/or of said vehicle interior space temperature sensor arrangement and/or of a vehicle interior space desired temperature presetting arrangement as the input variables.

10. A heating system in accordance with claim 5, wherein said controlling arrangement is designed to set the delivery capacity of said heating air blower on the basis of an output of said vehicle interior space temperature sensor arrangement and the interior space desired temperature preset by said vehicle interior space desired temperature presetting arrangement.

11. A heating system in accordance with claim 5, wherein said controlling arrangement comprises a first control device for controlling said heating air blower and said mixing arrangement as well as a second control device for controlling said heater, wherein said first control device has the output of an outside temperature sensor arrangement and/or of said vehicle interior space temperature sensor arrangement and/or of said vehicle interior space desired temperature presetting arrangement as the input variables.

12. A heating system for a vehicle, the heating system comprising:
a heating air blower for generating a heating air stream to be introduced into the interior space of the vehicle;
a heater comprising a heating burner supplied with fuel and combustion air for burning a fuel/air-mixture and generating heat;
a heat exchanger arrangement for transferring said heat to the heating air stream being delivered by said heating air blower;
a heating air stream temperature sensor arrangement for generating an output linked with the temperature at which the heating air stream heated by said heater is discharged;
a mixing arrangement for setting an outside air/ambient air ratio of the air to be fed to said heat exchanger arrangement;
an outside temperature sensor arrangement for generating an output linked with an outside temperature; and
a control arrangement for carrying out a parking heating operation control by controlling said mixing arrangement to set an outside air/ambient air ratio on the basis of an output of said outside temperature sensor arrangement and controlling said heater to set the heat output of said heater on the basis of the output of said heating air stream temperature sensor arrangement and of a fixedly set desired temperature of said heating air stream.

13. A heating system in accordance with claim 12, wherein said control device controls said mixing arrangement such that the outside air/ambient air ratio is lower in case of a lower outside temperature.

14. A heating system for a vehicle, the heating system comprising:
a heating air blower for generating a heating air stream to be introduced into the interior space of a vehicle;
a heating air stream temperature sensor arrangement for generating an output linked with the temperature at which the heating air stream heated by said heater is discharged;
a heater comprising a heating burner supplied with fuel and combustion air for burning a fuel/air-mixture and generating heat;
a heat exchanger arrangement for transferring said heat to the heating air stream being delivered by said heating air blower;
a mixing arrangement for setting an outside air/ambient air ratio of the air to be fed into said heat exchanger arrangement;
a vehicle interior space temperature sensor arrangement for generating an output linked with the temperature of the interior space of the vehicle; and
a control arrangement for carrying out a parking heating operation control by controlling said mixing arrangement for setting the outside air/ambient air ratio on the basis of the output of said vehicle interior space temperature sensor arrangement and controlling said heater to set the heat output thereof on the basis of the output of said heating air stream temperature sensor arrangement and of a fixedly set desired temperature of said heating air stream.

15. A heating system in accordance with claim 14, wherein said controlling arrangement controls said mixing arrangement such that the outside air/ambient air ratio is lower in case of a lower temperature of the interior space of the vehicle.

16. A heating system for a vehicle, the heating system comprising:
a heating air blower for generating a heating air stream to be introduced into the interior space of a vehicle;
a heater comprising a heating burner supplied with fuel and combustion air for burning a fuel/air-mixture and generating heat;
a heat exchanger arrangement for transferring said heat to the heating air stream being delivered by said heating air blower;
a heating air stream temperature sensor arrangement for generating an output linked with the temperature at which the heating air stream heated by said heater is discharged;
a mixing arrangement for setting an outside air/ambient air ratio of the air to be fed into said heat exchanger arrangement;
a vehicle interior space temperature sensor arrangement for generating an output linked with the temperature of the interior space of the vehicle;
a vehicle interior space desired temperature presetting arrangement; and
a control device for carrying out a parking heating operation control by controlling said mixing arrangement for setting the outside air/ambient air ratio on the basis of a deviation of the temperature of the interior space of the vehicle from the interior space desired temperature and controlling said heater to set the heat output thereof on the basis of the output of said heating air stream temperature sensor arrangement and of a fixedly set desired temperature of said heating air stream.

17. A heating system in accordance with claim 12, further comprising:
   a vehicle interior space desired temperature presetting arrangement; and
   a vehicle interior space temperature sensor arrangement, wherein said controlling arrangement is designed to set the delivery capacity of said heating air blower on the basis of an output of said vehicle interior space temperature sensor arrangement and the interior space desired temperature preset by said vehicle interior space desired temperature presetting arrangement.

18. A heating system in accordance with claim 12, wherein said controlling arrangement comprises a first control device for controlling said heating air blower and said mixing arrangement as well as a second control device for controlling said heater, wherein said first control device has the output of said outside temperature sensor arrangement and/or of a vehicle interior space temperature sensor arrangement and/or of a vehicle interior space desired temperature presetting arrangement as the input variables.

19. A heating system in accordance with claim 14, further comprising:
   a vehicle interior space desired temperature presetting arrangement, wherein said controlling arrangement is designed to set the delivery capacity of said heating air blower on the basis of an output of said vehicle interior space temperature sensor arrangement and the interior space desired temperature preset by said vehicle interior space desired temperature presetting arrangement.

20. A heating system in accordance with claim 14, wherein said controlling arrangement comprises a first control device for controlling said heating air blower and said mixing arrangement as well as a second control device for controlling said heater, wherein said first control device has the output of an outside temperature sensor arrangement and/or of said vehicle interior space temperature sensor arrangement and/or of a vehicle interior space desired temperature presetting arrangement as the input variables.

21. A heating system in accordance with claim 16, wherein said controlling arrangement is designed to set the delivery capacity of said heating air blower on the basis of an output of said vehicle interior space temperature sensor arrangement and the interior space desired temperature preset by said vehicle interior space desired temperature presetting arrangement.

22. A heating system in accordance with claim 16, wherein said controlling arrangement comprises a first control device for controlling said heating air blower and said mixing arrangement as well as a second control device for controlling said heater, wherein said first control device has the output of an outside temperature sensor arrangement and/or of said vehicle interior space temperature sensor arrangement and/or of said vehicle interior space desired temperature presetting arrangement as the input variables.

* * * * *